F. E. JOHNSON, JR

MANHOLE FOR PIPES AND SIMILAR CONTAINERS

Filed June 1, 1921

Patented May 29, 1923.

1,456,601

UNITED STATES PATENT OFFICE.

FRANCIS E. JOHNSON, JR., OF ORANGE, NEW JERSEY, ASSIGNOR TO THE M. W. KELLOGG COMPANY, A CORPORATION OF DELAWARE.

MANHOLE FOR PIPES AND SIMILAR CONTAINERS.

Application filed June 1, 1921. Serial No. 474,244.

*To all whom it may concern:*

Be it known that I, FRANCIS E. JOHNSON, Jr., a citizen of the United States, and resident of Orange, New Jersey, have invented certain new and useful Improvements in Manholes for Pipes and Similar Containers, of which the following is a disclosure.

My invention relates to manholes and like normally closed inlets for conduits and has as its principal object the provision of an arrangement whereby the losses in flow capacity of conduits caused by manholes and like structures are avoided.

The novel features of my invention are pointed out with particularity in the appended claim. The invention itself, however, with further objects and advantages will best be understood from the following description taken in connection with the accompanying drawing in which—

Figure 1:
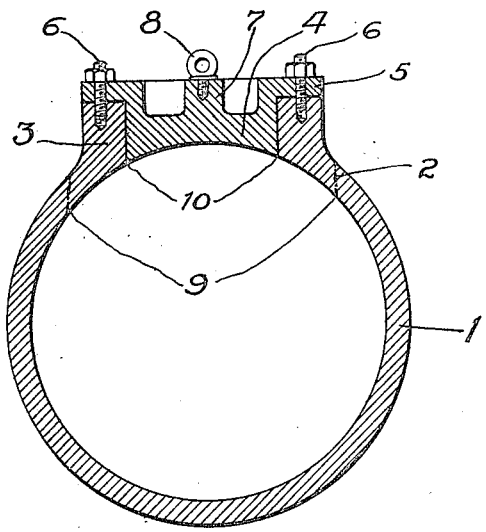
Fig. 1 is a cross-section of an hydraulic pipe line taken on line 1—1 of Fig. 2 through a manhole structure according to my invention, certain retained bolts being omitted for purposes of illustration.
Figure 2:
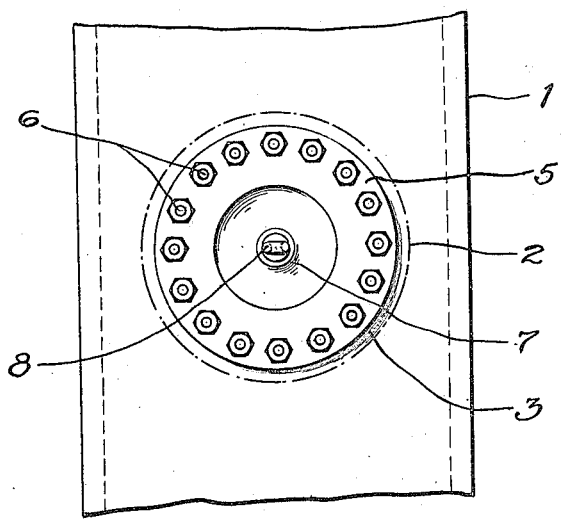
Fig. 2 is a plan view of the structure illustrated in Fig. 1, including also portions of the pipe line adjacent the manhole.

In the drawing, 1 is a pipe of forgeable material which has been cut out around the circular line 2 and a manhole structure according to my invention built into the opening thus formed. The manhole structure comprises a pad 3 of forgeable material projecting outwardly from the pipe on the outside and having the usual opening therein normally closed by member 4. Closure 4 has flange 5 thereon which contacts with the surface of pad 3 surrounding the opening in the pad. The pad is held in place by the usual bolts 6 passing thru flange 5, and I prefer to provide a central boss 7 on closure 4 into which an eye bolt 8 may be inserted for removing and replacing closure 4 when desired. I attach the pad 3 to the pipe 1 around the line 2 by a welding or forging operation.

According to my invention, the inner surfaces of the pad 3 and manhole closure 4 have the same form as the portion of the pipe removed, being parts of cylinders of the same diameter as the inner surface of pipe 1. Moreover, pad 3 comes flush with the pipe 1 around the line of union 2 between the pad and the pipe as indicated at 9, while the closure 4 comes flush with the pad 3 around the inner edge of the opening through the pad, as indicated at 10. Consequently, the pipe 1 presents a continuous inner surface to the fluid flowing therein, there being no shoulders, recesses, or projections to create eddies or otherwise reduce the efficiency or carrying capacity of the pipe line, by causing loss of head.

While I have illustrated and described the preferred form of my invention, I do not limit myself to details of description or illustration except in so far as such details are clearly included in the appended claim.

Having thus described my invention, I claim:

The combination of an apertured pipe of forgeable material, an apertured pad of forgeable material extending into said pipe, one edge of said pad coming flush with the inner surface of said pipe, the outer surface of said pad being firmly united to the edge of said pipe.

FRANCIS E. JOHNSON, JR.